United States Patent
Hiller et al.

(10) Patent No.: US 12,411,240 B2
(45) Date of Patent: Sep. 9, 2025

(54) AIRCRAFT FLIGHT PATH CLEARING LIGHT BEAMS

(71) Applicant: The Boeing Company, Arlington, VA (US)

(72) Inventors: Nathan D. Hiller, Irvine, CA (US); Claudia E. Fritz-Thompson, Bothell, WA (US)

(73) Assignee: The Boeing Company, Arlington, VA (US)

( * ) Notice: Subject to any disclaimer, the term of this patent is extended or adjusted under 35 U.S.C. 154(b) by 62 days.

(21) Appl. No.: 18/470,842

(22) Filed: Sep. 20, 2023

(65) Prior Publication Data

US 2025/0093512 A1   Mar. 20, 2025

(51) Int. Cl.
*G01S 17/88*   (2006.01)
*A01M 29/10*   (2011.01)
*B64F 1/00*   (2006.01)

(52) U.S. Cl.
CPC ............ *G01S 17/88* (2013.01); *A01M 29/10* (2013.01); *B64F 1/00* (2013.01)

(58) Field of Classification Search
CPC ................................ A01M 1/04; A01M 29/10
See application file for complete search history.

(56) References Cited

U.S. PATENT DOCUMENTS

| | | | | |
|---|---|---|---|---|
| 4,736,907 A * | 4/1988 | Steffen | ................... | B64D 45/00 244/1 R |
| 5,857,282 A * | 1/1999 | Odintsov | ................ | A01M 1/04 43/132.1 |
| 8,164,462 B1 * | 4/2012 | Bose | ..................... | A01M 29/18 89/37.01 |
| 10,045,525 B2 | 8/2018 | Husseiny et al. | | |
| 10,351,258 B1 * | 7/2019 | Barnes | ..................... | G01V 8/20 |
| 10,694,737 B2 | 6/2020 | Tillotson | | |
| 2003/0090391 A1 * | 5/2003 | Philiben | ................ | A01M 29/10 340/471 |
| 2007/0086912 A1 * | 4/2007 | Dowling | ................ | C02F 1/325 422/1 |
| 2016/0128315 A1 * | 5/2016 | Henskes | ............... | A01M 29/10 119/713 |
| 2020/0172265 A1 * | 6/2020 | Kestler | .................. | B64D 47/06 |

FOREIGN PATENT DOCUMENTS

| | | |
|---|---|---|
| CN | 210951066 U | 7/2020 |
| CN | 113558037 A | 10/2021 |
| JP | 2009027940 A | 2/2009 |
| WO | WO-2010023253 A1 * | 3/2010 ............ A01M 29/10 |
| WO | 2021181836 A1 | 9/2021 |

OTHER PUBLICATIONS

Smith, Jr., "An Overview of Insect Residue Accretion and Mitigation Strategies on Aerodynamic Surfaces," Adv Polym Sci, Dec. 3, 2019, pp. 217-234, vol. 284, Springer Nature Switzerland, accessed Sep. 18, 2023, https://doi.org/10.1007/12_2018_44.

* cited by examiner

*Primary Examiner* — Christopher D Hutchens
(74) *Attorney, Agent, or Firm* — Yee & Associates, P.C.

(57) ABSTRACT

A flight path clearing system comprises a light beam generator configured to emit a set of light beams and a controller. The controller is configured to select a set of wavelengths for the set of light beams that attract insects and control the light beam generator to emit the set of light beams with the set of wavelengths in a direction relative to the flight path for an aircraft.

37 Claims, 13 Drawing Sheets

12,411,240 B2

AIRCRAFT FLIGHT PATH CLEARING LIGHT BEAMS

BACKGROUND INFORMATION

1. Field

The present disclosure relates generally to aircraft and, in particular, clearing flying insects from aircraft flight paths.

2. Background

In operating commercial airplanes, optimal performance of these airplanes occurs under clean conditions. Having clean aerodynamic surfaces such as wings, fuselage, and other locations are needed to provide a smooth flow of air. Debris, dirt, residue, or other material can disrupt the desired airflow resulting in decreased aerodynamic performance.

One source of decreased aerodynamic performance results from insect residue that occurs from insects impacting the surfaces of an airplane. The insect residue from impacts with flying insects can increase the surface roughness of an airplane including the leading edges of wings, the nose of the aircraft, and other locations. With respect to the aircraft wings, this type of rough surface can promote an earlier transition from laminar to turbulent airflow. This and other types of airflow disruption increases the drag. As a result, the engines of aircraft work harder to maintain the same speed with the increased drag. The situation results in increased fuel use and decreased fuel efficiency.

Further, this type of insect residue can also interfere with sensors on the exterior of the aircraft. As a result, the accuracy of readings from air speed, angle of attack, and other parameters can be impacted by insect residue.

Different approaches have been used to reduce the issues with insect residue. For example, coatings can be used to reduce the adhesion of insects to the surface of the aircraft. These coatings can also be used to increase the ease with which insect residue is removed. Mechanical scrapers have been used to remove insect residue. Another approach involves deflectors that deflect or block insects to reduce impacts with aerodynamic surfaces on aircraft.

Therefore, it would be desirable to have a method and apparatus that take into account at least some of the issues discussed above, as well as other possible issues. For example, it would be desirable to have a method and apparatus that overcome a technical problem with the reduction in aerodynamic efficiency resulting from insect residue.

SUMMARY

An embodiment of the present disclosure provides a flight path clearing system comprising a light beam generator configured to emit a set of light beams and a controller. The controller is configured to select a set of wavelengths for the set of light beams that attract insects. The controller is configured to control the light beam generator to emit the set of light beams with the set of wavelengths in a direction relative to the flight path for an aircraft.

Another embodiment of the present disclosure provides a method for clearing a flight path clearing. A set of wavelengths is selected for a set of light beams that attract insects. The set of light beams with the set of wavelengths is emitted in a direction relative to the flight path for an aircraft.

Yet another embodiment of the present disclosure provides a lidar system comprising a laser beam generator, receiver, and a controller. The laser beam generator is configured to emit a set of laser beams. The receiver is configured to detect a backscatter light generated in response to the laser beam generator emitting the set of laser beams. In a first mode of operation, the controller is configured to control the laser beam generator to emit a set of laser beams, detect the backscatter light generated in response to the laser beam generator emitting the set of laser beams using the receiver, and determine a set of parameters using the backscatter light detected by the receiver. In a second mode of operation, the controller is configured to select a set of wavelengths that attract insects and control the light beam generator to emit the set of light beams with the set of wavelengths in a direction relative to a flight path for an aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, reduced aerodynamic performance occurs with insect residue on the surface of an aircraft. This insect residue results from flying insects impacting the surface of an aircraft. Most flying insects are typically found at altitudes of 500 feet or less.

Although a number of different approaches have been tried to reduce the effects of insect contamination or insect residue that forms on the surface of an aircraft in response to impact with flying insects, these different approaches have not been able to provide a desired level of aerodynamic performance or fuel efficiency.

Most flying insects occupy an area that is 500 feet or less above the ground. As a result, the first minute of the flight can ruin the desired aerodynamic performance for the rest of the flight when insect residue forms on the surface of the aircraft from impacting flying insects. In a similar fashion, impacts with insects can also occur during landing when the aircraft decreases to an altitude 500 feet and less for landing.

As a result, reducing or preventing insect impacts with an aircraft during the first portion of the flight of the aircraft have an effect of maintaining aerodynamic performance during the other portions of the flight. Further by reducing impacts with flying insects during the last portion of the flight, cleaning or other treatment of the aircraft can be reduced or avoided. As a result, turnaround time for the next flight can be reduced when insect residue does not need to be removed from the surface of aircraft.

The illustrative embodiments provide a method, apparatus, and system for reducing insect residue accumulation on the surface of an aircraft. A flight path clearing system comprises a light beam generator configured to emit a set of light beams and a controller. The controller is configured to select a set of wavelengths for the set of light beams that attract insects and control the light beam generator to emit the set of light beams with the set of wavelengths in a direction relative to the flight path for an aircraft.

Figure 1:
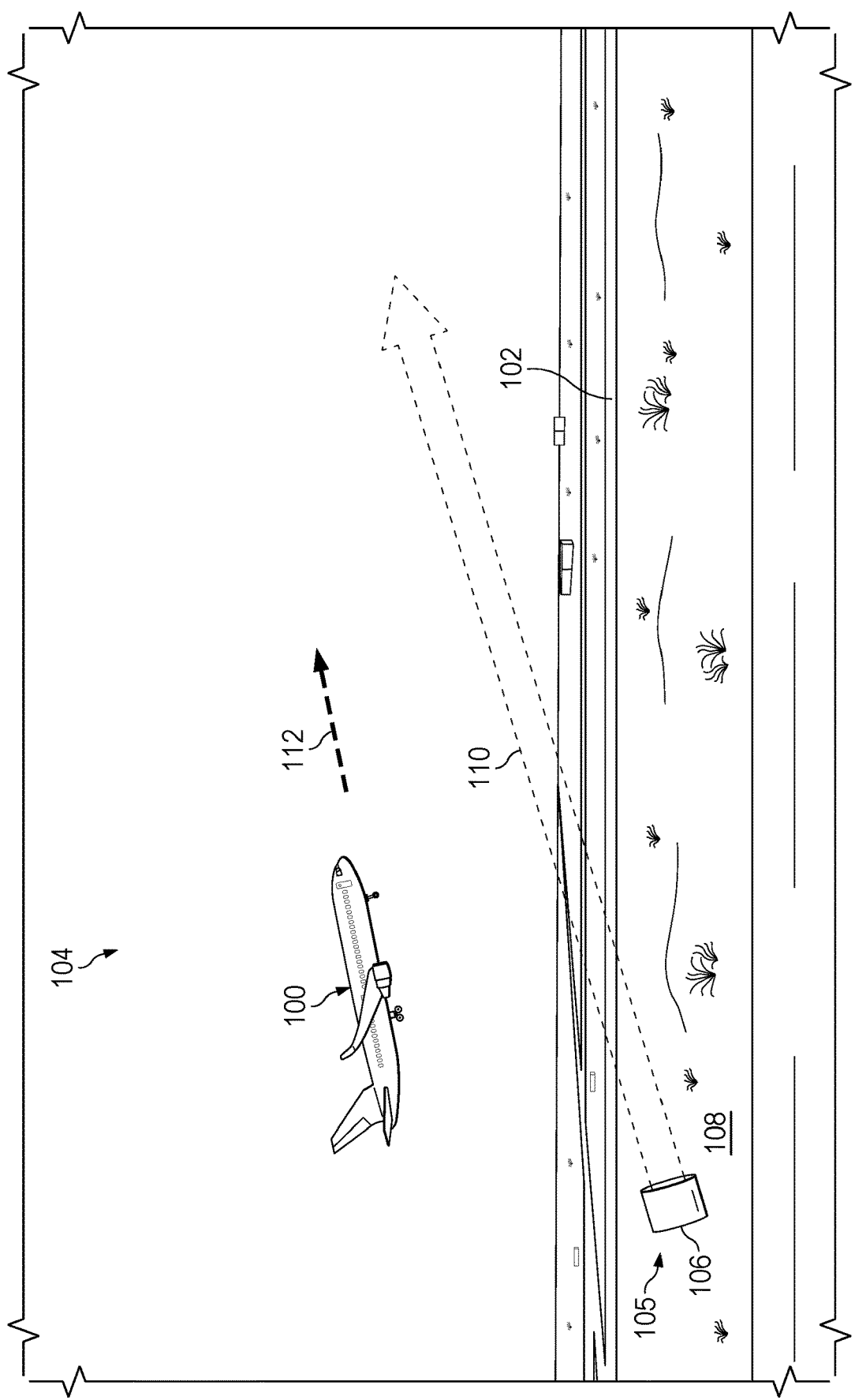
FIG. 1 is an illustration of an aircraft flight environment in accordance with an illustrative embodiment.

With reference now to the figures in particular with reference to FIG. 1, an illustration of an aircraft flight environment is depicted in accordance with an illustrative embodiment. In this illustrative example, commercial airplane 100 is shown taking off from runway 102 in aircraft flight environment 104.

As depicted in this example, light beam generator 105 comprises light source 106 that is located on ground 108 and emits light beam 110 relative to flight path 112 for commercial airplane 100. In this example, light beam 110 is emitted by light source 106 in a direction that is co-linear with flight path 112.

In this illustrative example, light beam 110 has characteristics that are selected to attract insects in a manner that reduces insects along flight path 112. For example, light beam 110 may have a wavelength for ultraviolet light. This wavelength can be selected for use during daylight to attract insects toward light beam 110 and away from flight path 112.

Thus, the emission of light beam 110 in the direction relative to flight path 112 of commercial airplane 100 can reduce insects in flight path 112. The direction of light beam 110 is selected to cause insects to move away from flight path 112.

In this example, by clearing flight path 112 for commercial airplane 100 at lower altitudes where insects are more likely to be found, the occurrence of insect residue on commercial airplane 100 can be reduced. The reduction of this residue maintains a desired level of aerodynamic performance that can avoid increasing fuel usage by commercial airplane 100. In this example, these lower altitudes can be, for example, 500 feet or less from ground 108.

Illustration of aircraft flight environment 104 is provided as an example of one implementation for emitting light beam 110 to clear flight path 112 for commercial airplane 100. Other configurations for emitting light beams to clear flight paths are shown in other figures in this disclosure.

Figure 2:
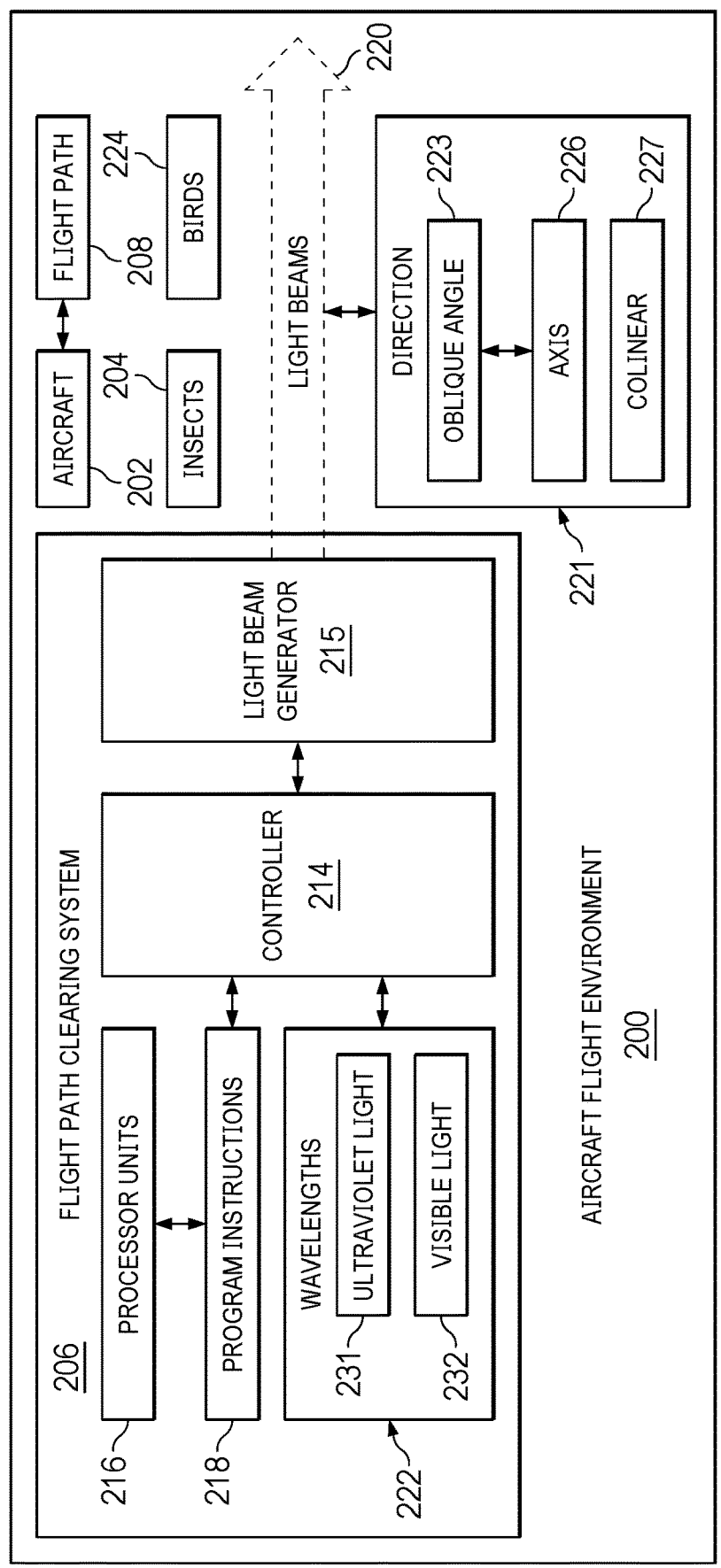
FIG. 2 is an illustration of a block diagram of an aircraft flight environment in accordance with an illustrative embodiment.

With reference now to FIG. 2, an illustration of a block diagram of an aircraft flight environment is depicted in accordance with an illustrative embodiment. In this illustrative example, aircraft flight environment 200 is an environment in which aircraft 202 operates. Aircraft 202 can take a number of different forms. For example, aircraft 202 can be selected from a group comprising an aircraft, a commercial airplane, a cargo airplane, a tilt-rotor aircraft, a tilt wing aircraft, a vertical takeoff and landing aircraft, an unmanned aerial vehicle, a drone, and other suitable types of aircraft.

Undesired contact with insects 204 during operation of aircraft 202 can result in undesired aerodynamics for aircraft 202. This contact can result in the formation of insect residue that can reduce the aerodynamic performance of aircraft 202.

In this example, flight path clearing system 206 can be used to clear insects 204 from flight path 208 of aircraft 202. Flight path clearing system 206 includes a number of different components. As depicted, flight path clearing system 206 comprises light beam generator 215 and controller 214.

Light beam generator 215 is a hardware component or system that is configured to emit a set of light beams 220. As used herein, a "set of" when used with reference items means one or more items for example, set of light beams 220 is one or more light beams. Light beam generator 215 can be located in a ground location or in aircraft 202 depending on the particular implementation.

In this example, light beam generator 215 can be selected from at least one of laser, a xenon arc lamp, a halogen lamp, a light emitting diode lamp system, a coherent light source, or other types of light sources that can emit light beams 220. As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

A light beam is a directed propagation of photons or electromagnetic radiation. A light beam can be considered a collection of light rays traveling in the same direction.

In this example, the set of light beams 220 can take a number of different forms. For example, the set of light beams can be selected from at least one of a parallel beam, a divergent beam, a convergent beam, a collimated beam, a coherent light beam, a laser beam, a polarized beam, or some other suitable type of light being.

The set of light beams 220 can also have different wavelengths. For example, the set of light beams 220 can have a wavelength from 100 nm to 700 nm. Within this range, 100 nm to 400 nm is considered to be ultraviolet light 231 in the set of wavelengths 222 and 400 nm to 700 nm is considered visible light 232 in the set of wavelengths 222.

Further, a light beam in the set of light beams 220 can be modulated by changing an intensity, changing a wavelength, or pulsing an emission of the light beam. With this example, one or more light beams can be modulated while other light beams can remain constant. Further, in other illustrative examples, different light beams in the set of light beams 220 can be modulated differently from the other light beams.

In this example, controller 214 is in communication with light beam generator 215 and controls the operation of light beam generator 215. Controller 214 can be implemented in software, hardware, firmware or a combination thereof.

When hardware is employed, the hardware can include circuits that operate to perform the operations in controller 214. In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

When software is used, the operations performed by controller 214 can be implemented in program instructions 218 configured to run on hardware, such as a set of processor units 216. When firmware is used, the operations performed by controller 214 can be implemented in program instructions and data and stored in persistent memory to run on a processor unit.

Program instructions 218 are computer-readable program instructions. As used herein, a processor unit in the number of processor units 216 is a hardware device and is comprised of hardware circuits such as those on an integrated circuit that respond to and process instructions and program code that operate a computer. When the number of processor units 216 executes program instructions 218 for a process, the number of processor units 216 can be one or more processor units that are in the same computer or in different computers. In other words, the process can be distributed between processor units 216 on the same or different computers in a computer system.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In the illustrative example, controller 214 selects a set of wavelengths 222 for the set of light beams 220 that attract insects 204.

Controller 214 controls light beam generator 215 to emit the set of light beams 220 with the set of wavelengths 222 in direction 221 relative to the flight path 208 for aircraft 202. In the illustrative example, light beams can have the same or different wavelength in the set of wavelengths 222.

In controlling light beam generator 215 to emit the set of light beams 220, controller 214 controls light beam generator 215 to emit the set of light beams 220 with the set of wavelengths 222 in direction 221 relative to the flight path 208 for aircraft 202 such that insects 204 in flight path 208 for the aircraft are reduced.

In one illustrative of example, controller 214 controls light beam generator 215 to emit the set of light beams 220 with the set of wavelengths 222 in direction 221 that is colinear 227 to flight path 208 of aircraft 202. In this example, the set of light beams 220 travels in direction 221 that aligns with or is in the same direction as flight path 208 of aircraft 202.

In another example, controller 214 controls light beam generator 215 to emit the set of light beams 220 in direction 221 that has oblique angle 223 to axis 226 in direction 221 relative to flight path 208 of aircraft 202. In this example, direction 221 can be characterized as a linear trajectory along axis 226 in which the set of light beams 220 is not emitted parallel or directly along axis 226 but instead at an angle that results in an increasing gap between the set of light beams 220 and axis 226 as set of light beams 220 travel from the source, which is light beam generator 215 in this example. In other words, set of light beams 220 spread or angle away from axis 226 as the set of light beams 220 travel away from light beam generator 215.

In yet another illustrative example, controller 214 controls light beam generator 215 to emit a pair of light beams 220 with the set of wavelengths 222 in direction 221 of flight path 208 for aircraft 202 and on either side of flight path 208 for aircraft 202. With this example, controller 214 can control light beam generator 215 to move the pair of light beams 220 on either side of flight path 208 from being colinear 227 with direction 221 relative to flight path 208 to oblique angle 223 to axis 226 in direction 221 relative to flight path 208. With this example, the pair of light beams 220 can start parallel to axis 226 and sweep away from axis 226.

In another example, controller 214 controls light beam generator 215 to emit the set of light beams 220 with the set of wavelengths 222 in direction 221 relative to flight path 208 for aircraft 202 that is below aircraft 202. In a different example, controller 214 controls light beam generator 215 to emit the set of light beams 220 with the set of wavelengths 222 in direction 221 relative to flight path 208 for aircraft 202 that is above aircraft 202.

Thus, flight path clearing system 206 can operate to reduce the number of insects 204 in flight path 208 for aircraft 202. Further, the system can also reduce the number of birds 224 in flight path 208. In this example, by attracting or moving insects 204 away from flight path 208, birds 224 that feed on insects 204 also may be moved away from flight path 208 in response to birds 224 following the movement of insects 204. As a result, the number of bird strikes on aircraft 202 can be reduced.

Figure 3:
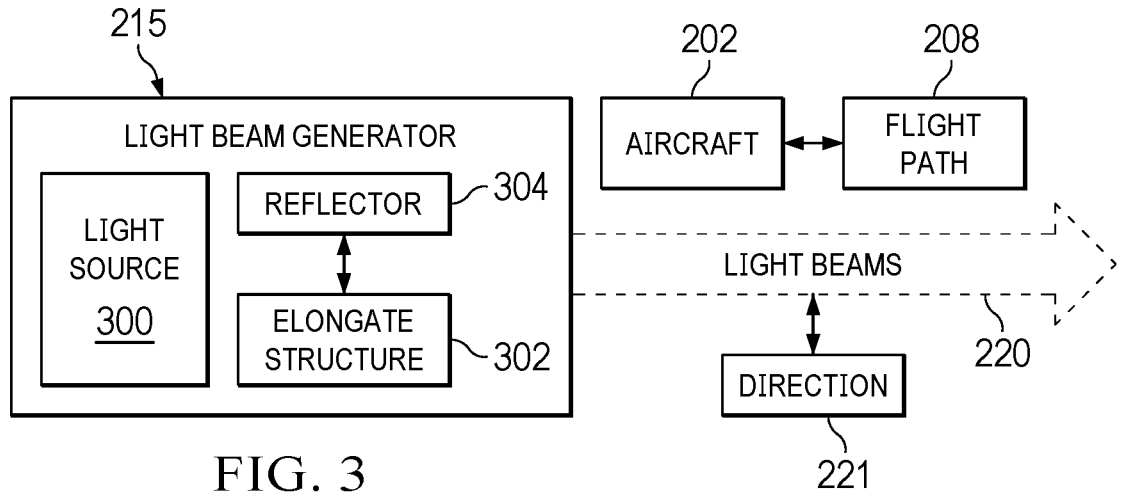
FIG. 3 is an illustration of a light beam generator in accordance with an illustrative embodiment.

With reference next to FIG. 3, an illustration of a light beam generator is depicted in accordance with an illustrative embodiment. In the illustrative examples, the same reference numeral may be used in more than one figure. This reuse of a reference numeral in different figures represents the same element in the different figures.

As depicted, light beam generator 215 can be implemented using a number of different components. As depicted in one example, light beam generator 215 comprises light source 300, elongate structure 302, and reflector 304. Elongate structure 302 can be a beam, a pole, a tower, or some other suitable structure.

In this example, reflector 304 is connected to a first end of elongate structure 302 and second end of elongate structure 302 is connected to the ground. In this example, light source 300 is positioned to emit the set of light beams at reflector 304.

When one component is "connected" to another component, the connection is a physical connection. For example, a first component, reflector 304, can be considered to be physically connected to a second component, elongate structure 302, by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both. In some examples, the first component can be physically connected to the second component by being located within the second component.

Reflector 304 is positioned to direct the set of light beams 220 in direction 221 relative to flight path 208 for aircraft 202 in FIG. 2. Reflector 304 comprises one or more components that can redirect the set of light beams 220 generated by light source 300. Reflector 304 can include at least one of a mirror, a parabolic mirror, hysterical mirror, a prism, a lens, a Fresnel lens, a collimator, a diffraction grating, or other components. In this illustrative example, reflector 304 can be movably positioned to change direction 221 of the set of light beams 220.

Figure 4:
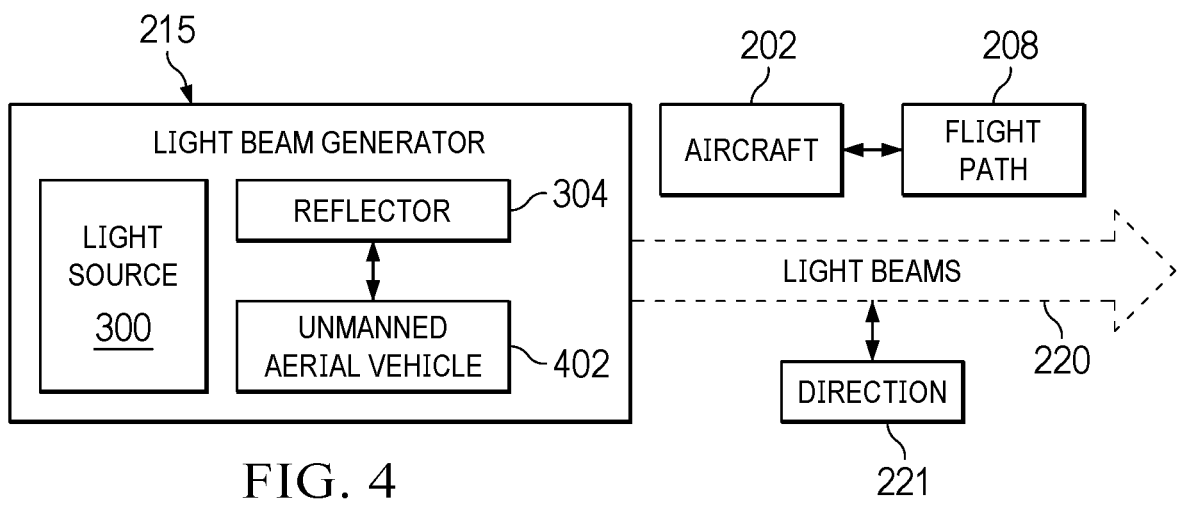
FIG. 4 is an illustration of a light beam generator in accordance with an illustrative embodiment.

Turning to FIG. 4, another illustration of a light beam generator is depicted in accordance with an illustrative embodiment. As depicted in this figure, light beam generator 215 can be implemented using a number of different components. As depicted in one example, light beam generator 215 comprises light source 300, unmanned aerial vehicle 402, and reflector 304.

With this example, reflector 304 is connected to unmanned aerial vehicle 402.

With this example, light source 300 is positioned to emit set of light beams 220 at reflector 404 while unmanned aerial vehicle 402 is flying. As a result, unmanned aerial vehicle 402 with reflector 304 can be positioned to direct the set of light beams 220 in direction 221 relative to flight path 208 for aircraft 202.

In one illustrative example, one or more solutions are present that overcome a problem with insect residue forming on surfaces of an aircraft. As a result, one or more solutions may provide an effect reducing the formation of insect residue on aerodynamic surfaces of aircraft. In one or more illustrative examples, a set of light beams can have one or more wavelengths selected to attract insects. The set of light beams can be emitted in a direction relative to the flight path of the aircraft. These light beams attract the insects such that the insects move away from the flight path of the aircraft. As result, a number of insects impacting the aircraft can be reduced, thereby reducing the formation of insect residue on aerodynamic surfaces of the aircraft.

As a result, increased aerodynamic performance can be present. This increased aerodynamic performance can reduce fuel usage during flight, resulting in increased fuel efficiency for an aircraft.

The illustration of aircraft flight environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although the light beam generator 215 is shown as a single block for generating the set of light beams 220, light beam generator 215 can be a number of distributed components in different locations that emit the set of light beams 220. Further, in some illustrative examples, light beam generator 215 can be located both in a ground location and on aircraft 202. Further, light beam generator 215 can also include at least one of a mirror, a lens, or other components in addition to or in place of a reflector to focus and direct light as a light beam with low divergence.

Figure 5:
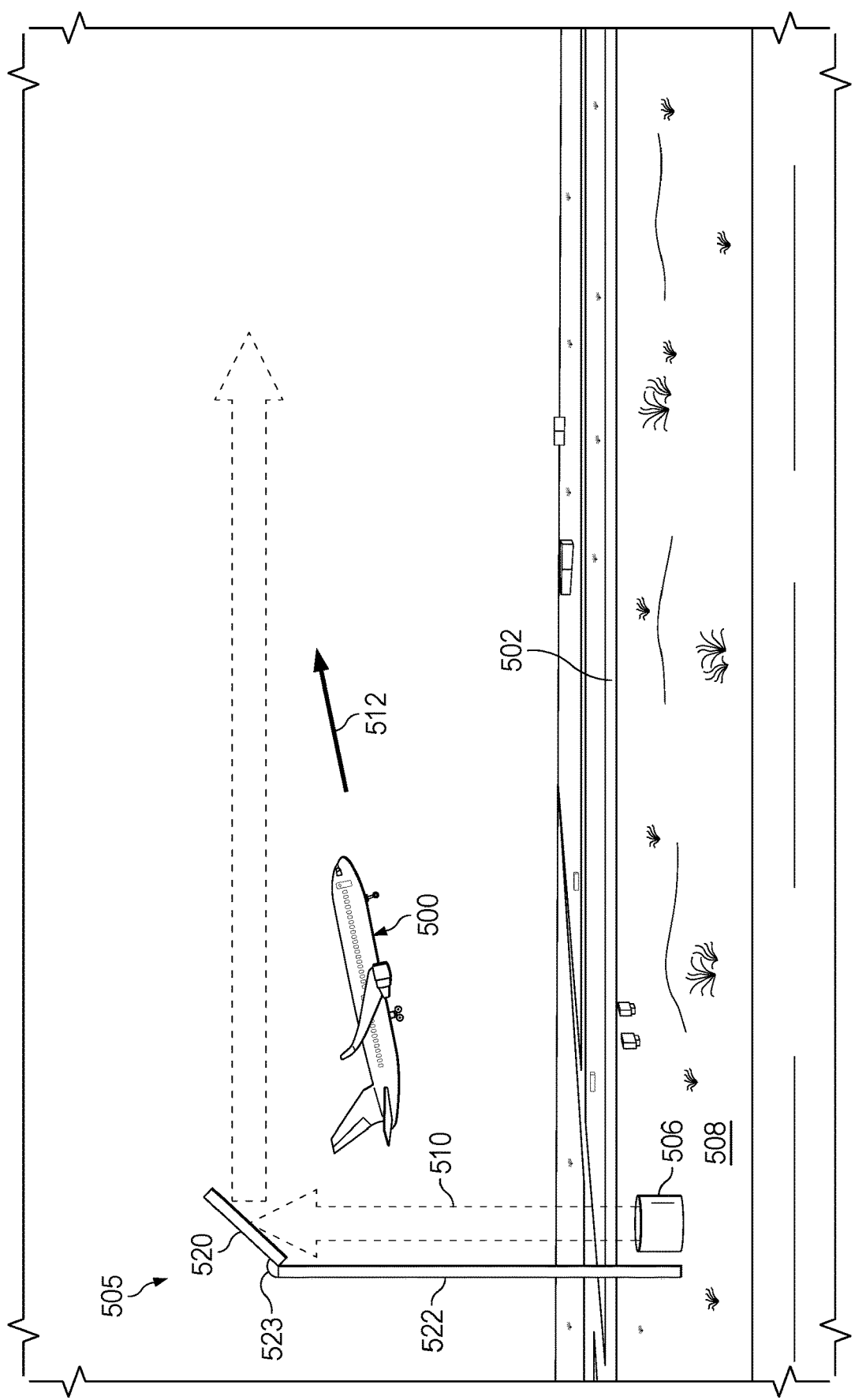
FIG. 5 is an illustration of light beam generation in accordance with an illustrative embodiment.

With reference now to FIG. 5, an illustration of light beam generation is depicted in accordance with an illustrative embodiment. In this depicted example, light beam generator 505 is an example of an implementation for light beam generator 215 as depicted in FIG. 3. In this example, light beam generator 505 comprises light source 506, beam 522, and reflector 520.

In this illustrative example, commercial airplane 500 is shown taking off from runway 502. As depicted in this example, light source 506 is located on ground 508 and emits light beam 510 relative to flight path 512 for commercial airplane 500. In this example, light beam 510 is emitted at reflector 520 connected to end 523 of beam 522.

Reflector 520 is positioned such that light beam 510 is reflected to travel in a direction relative to flight path 512 of commercial airplane 500 that is above commercial airplane 500. In this illustrative example, light beam 510 has characteristics that are selected to attract insects in a manner that reduces insects along flight path 512.

Thus, the emission of light beam 510 in the direction relative to flight path 512 of commercial airplane 500 can reduce insects in flight path 512.

In this example, by clearing flight path 512 for commercial airplane 500 at lower altitudes where insects are more likely to be found, the occurrence of insect residue on commercial airplane 500 can be reduced. The reduction of this insect residue maintains a desired level of aerodynamic performance that can avoid increasing fuel usage by commercial airplane 500. In this example, these lower altitudes can be, for example, 500 feet or less from ground 108.

Figure 6:
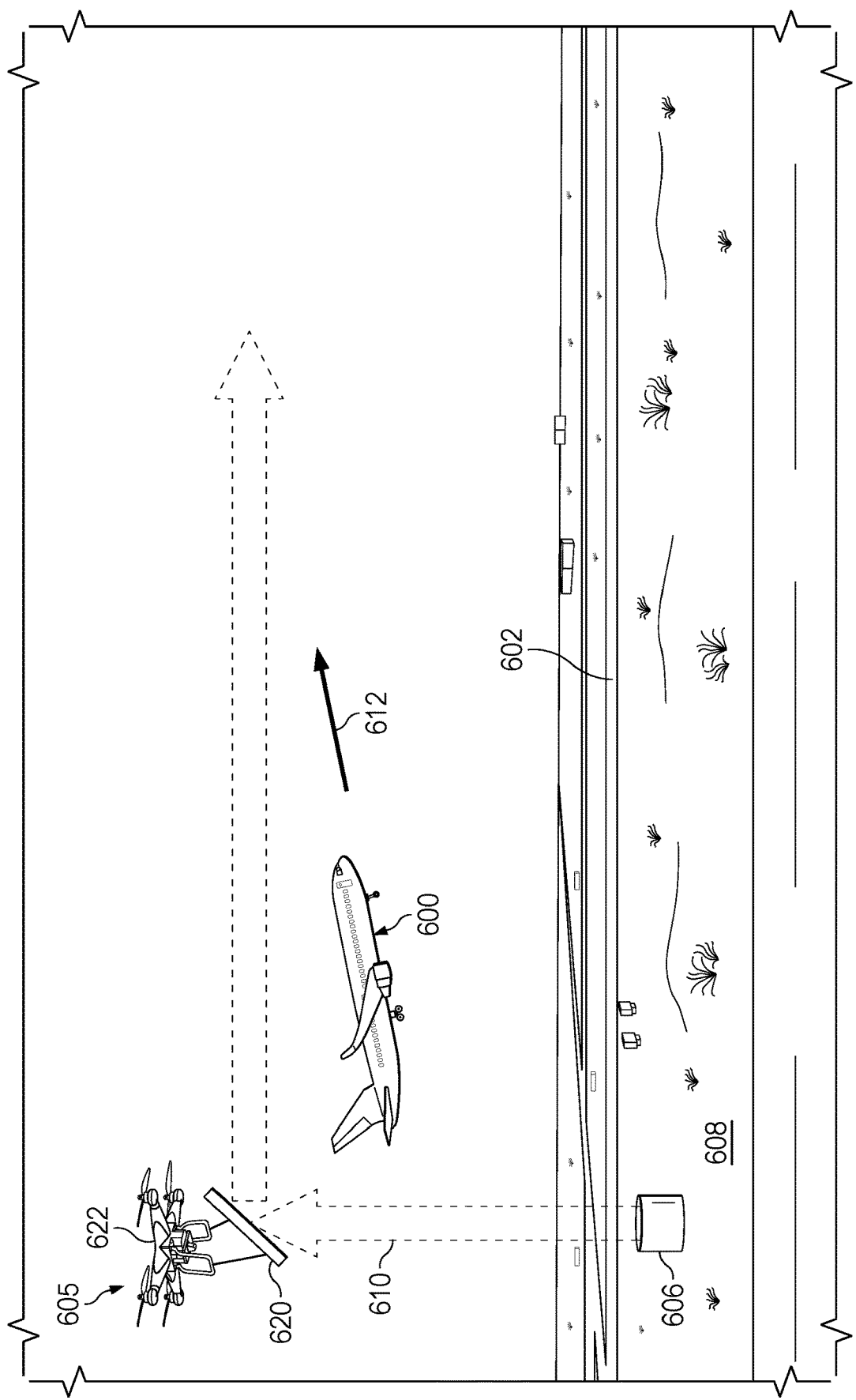
FIG. 6 is an illustration of light beam generation in accordance with an illustrative embodiment.

With reference next to FIG. 6, an illustration of light beam generation is depicted in accordance with an illustrative embodiment. In this depicted example, light beam generator 605 is an example of an implementation for light beam generator 215 as depicted in FIG. 3. In this illustrative example, light beam generator 605 comprises light source 606, drone 622, and reflector 620.

In this illustrative example, commercial airplane 600 is shown taking off from runway 602. As depicted in this example, light source 606 is located on ground 608 and emits light beam 610 relative to flight path 612 for commercial airplane 600. In this depicted example, light beam 610 is emitted by light source 606 at reflector 620 connected to drone 622.

Drone 622 can fly at different altitudes to reflect light beam 610 in a desired direction. In this example, the altitudes can be, for example, 500 feet or less from ground 108.

In this example, reflector 620 is positioned such that light beam 610 from light source 606 is reflected to travel in a direction relative to flight path 612 of commercial airplane 600 that is above commercial airplane 600. In this illustrative example, light beam 610 has characteristics that are selected to attract insects in a manner that reduces insects along flight path 612.

Thus, the emission of light beam 610 in the direction relative to flight path 612 of commercial airplane 600 can reduce insects in flight path 612. By clearing flight path 612 for commercial airplane 600, the occurrence of insect residue on commercial airplane 600 can be reduced.

In this example, drone 622 flies in the air on a temporary basis. As result, drone 622 is not an obstacle or object located on the ground. This type of support structure for reflector 620 can be used in place of beam 522 in FIG. 5 when concerns may be present with respect to the positioning of structures relative to a runway.

Figure 7:
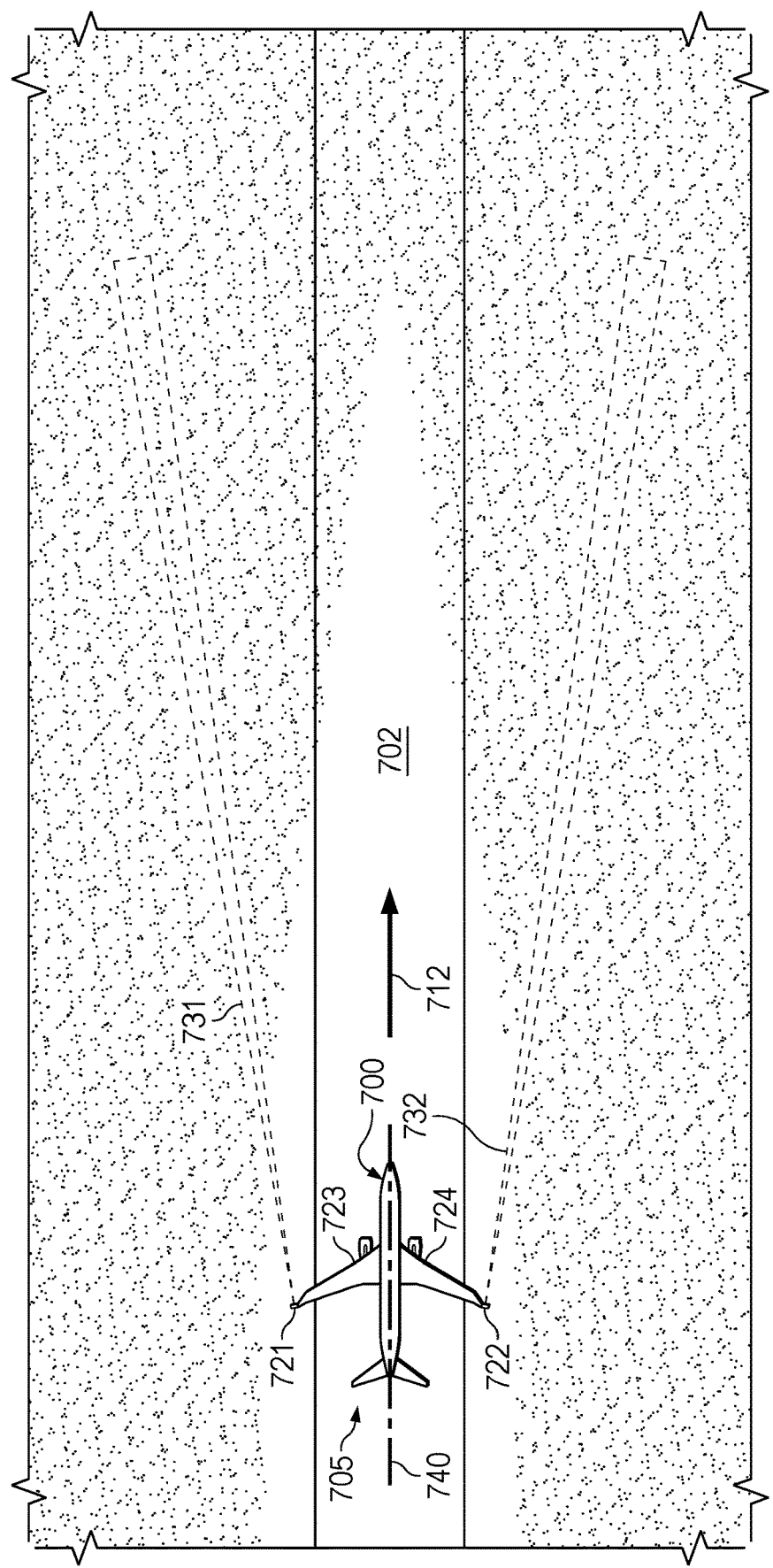
FIG. 7 is an illustration of light beam generation in accordance with an illustrative embodiment.

Turning to FIG. 7, an illustration of light beam generation is depicted in accordance with an illustrative embodiment. In this depicted example, light beam generator 705 is an example of an implementation for light beam generator 215 as depicted in FIG. 3.

A top view of commercial airplane 700 is shown taking off from runway 702. In this example, light beam generator 705 is located on commercial airplane 700. In this example, light beam generator 705 comprises light source 721 and light source 722. As depicted, light source 721 is located on wing 723 of commercial airplane 700 and light source 722 is located on wing 724 of commercial airplane 700.

In this example, light source 721 emits light beam 731 and light source 722 emits light beam 732. These light beams are emitted on either side of commercial airplane 700 and in a direction relative to flight path 712 for commercial airplane 700.

In this example, light beam 731 and light beam 732 are emitted in any direction that has an oblique angle to axis 740 in the direction relative to flight path 712. Further, in another illustrative example, light beam 731 and light beam 732 can be swept from a direction collinear to flight path 712 to a direction that has an oblique angle relative to axis 740 as depicted. The sweeping motion can be used to draw insects further away from flight path 712.

The illustrations of emitting light beams to reduce the presence of insects on a flight path in FIG. 5-7 are provided as examples of an implementation of flight path clearing system 206 in FIG. 2 and are not meant to limit the manner in which other illustrative examples can be implemented. For example, the altitude given as an illustrative example is 500 feet or less. In other examples, other altitudes can be used depending on the prevalence of insects at different altitudes. The light beam can be used at altitudes such as 750 feet, 1500 feet, or some other suitable altitude. Further, in another example, additional light sources can be present in other locations to generate one or more light beams in addition to light beams depicted in these examples. These light beams can be directed at the same altitudes or at different altitudes using mechanisms such as reflectors connected to beams or drones. In other illustrative examples, the light source can be connected to a drone in place of using reflectors.

Figure 8:
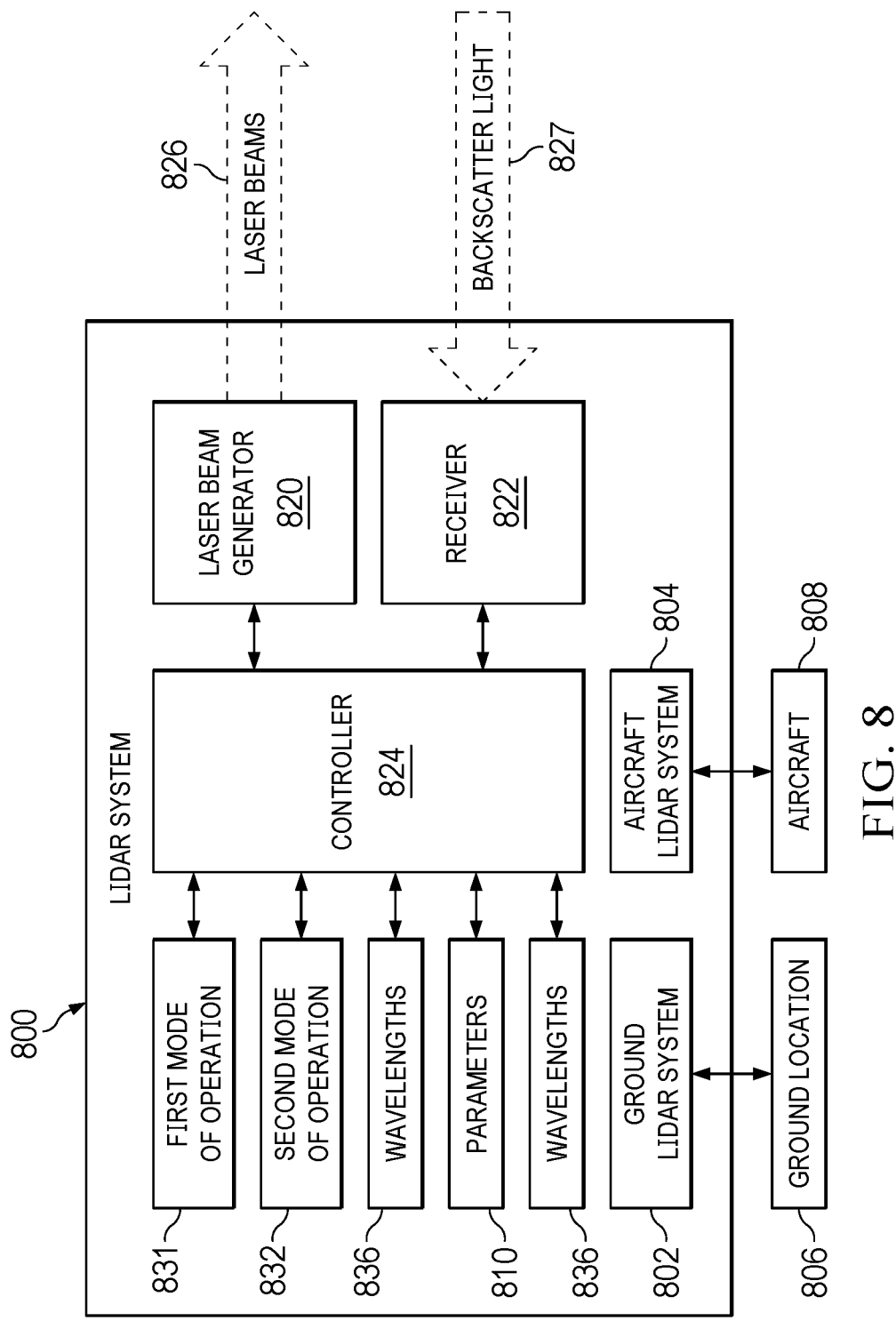
FIG. 8 is an illustration of a lidar system in accordance with an illustrative embodiment.

Next in FIG. 8, an illustration of a lidar system is depicted in accordance with an illustrative embodiment. In this illustrative example, lidar system 800 can be one of ground lidar system 802 or aircraft lidar system 804.

As ground lidar system 802, the system can be implemented in ground location 806. Ground location 806 can be, for example, an airport, adjacent to a runway at an airport, in a building, or some other suitable ground location.

In this example, aircraft lidar system 804 is located in aircraft 808. Aircraft 808 can be selected from a group comprising an aircraft, a commercial airplane, a cargo airplane, a tilt-rotor aircraft, a tilt wing aircraft, a vertical takeoff and landing aircraft, an unmanned aerial vehicle, a drone, and other suitable types of aircraft.

Lidar system 800 is a sensor system that can be used to detect a set of parameters 810. As depicted, lidar system 800 comprises laser beam generator 820, receiver 822, and controller 824.

Controller 824 controls the operation of laser beam generator 820 and receiver 822. As with controller 214 in FIG. 2, controller 824 can be implemented in software, hardware, firmware or a combination thereof.

In this example, laser beam generator 820 is a light source that generates coherent light. This coherent light is emitted as a set of laser beams 826.

Backscatter light 827 is generated in response to laser beam generator 820 emitting the set of laser beams 826 into the atmosphere.

Backscattering is the reflection of a laser beam back to the direction from which the laser beam originated. The backscattering can be from a diffuse reflection due to scattering in the air.

In this illustrative example, the set of laser beams 826 can be scattered by at least one of air or objects in air. These objects can include water droplets, dust, and other particles suspended in the air.

Backscatter light 827 is detected by receiver 822. Receiver 822 can be implemented using a telescope, which contains optical components that can both receive and transmit light. Receiver 822 can also include a detection system that detects backscatter light 827. For example, the detection system can measure a set of characteristics for backscatter light 827. The set of characteristics can include at least one of a signal strength, a polarization, a wavelength, a frequency, an intensity, or other characteristics from backscatter light 827.

The measurements of these characteristics can be sent to controller 824, which can determine a set of parameters 810. When lidar system 800 is aircraft lidar system 804, the set of parameters 810 can be, for example, at least one of a speed, a direction of travel, a temperature, air density, an angle of sideslip, an angle of attack, a presence of a group of objects, or some other suitable parameters.

When lidar system 800 is ground lidar system 802, the set of parameters 810 can be at least one of clear air turbulence, wake turbulence, wind shear, a wind profile, a temperature profile, an aerosol concentration, a particular concentration, or a presence of a group of objects.

In this illustrative example, controller 824 has several modes of operation. In first mode of operation 831, controller 824 controls laser beam generator 820 to emit a set of laser beams 826 and detect, using receiver 822, backscatter light 827 generated in response to laser beam generator 820 emitting the set of laser beams 826. In this mode of operation, controller 824 also determines a set of parameters 810 using backscatter light 827 detected by receiver 822.

In second mode of operation 832, controller 824 selects a set of wavelengths 836 that attract insects. Controller 824 also controls laser beam generator 820 to emit the set of laser beams 826 with the set of wavelengths 836 in a direction relative to a flight path for an aircraft.

Figure 9:
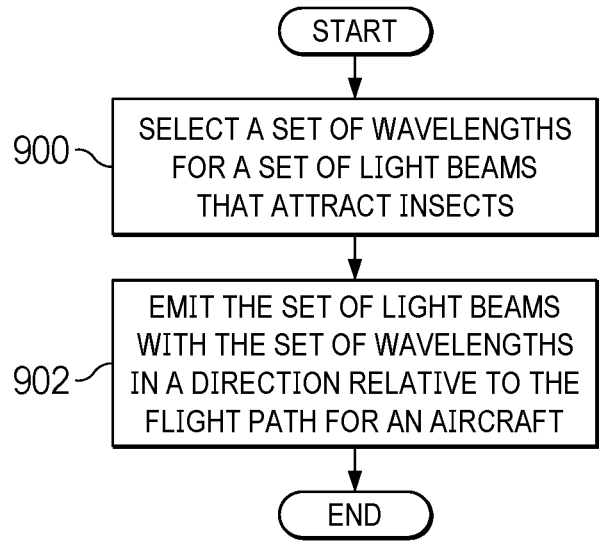
FIG. 9 is an illustration of a flowchart of a process for clearing a flight path in accordance with an illustrative embodiment.

Turning next to FIG. 9, an illustration of a flowchart of a process for clearing a flight path is depicted in accordance with an illustrative embodiment. The process in FIG. 9 can be implemented in hardware, software, or both. When implemented in software, the process can take the form of program instructions that are run by one of more processor units located in one or more hardware devices in one or more computer systems. For example, the process can be implemented in controller 214 in FIG. 2 and in controller 824 in FIG. 8.

The process selects a set of wavelengths for a set of light beams that attract insects (operation 900).

The process emits the set of light beams with the set of wavelengths in a direction relative to the flight path for an aircraft (operation 902). The process terminates thereafter. In this example, insects can be reduced in the flight path of the aircraft. Further, birds can also be reduced in the flight path for the aircraft as a result of reducing the insects in the flight path for the aircraft.

In this example, operation 900 can be performed using a light beam generator. This light beam generator can be located in a ground location or on an aircraft. In one example, the set of light beams are selected to have a set of wavelengths selected from at least one of 100 nm to 400 nm or 400 nm to 700 nm.

Figure 10:
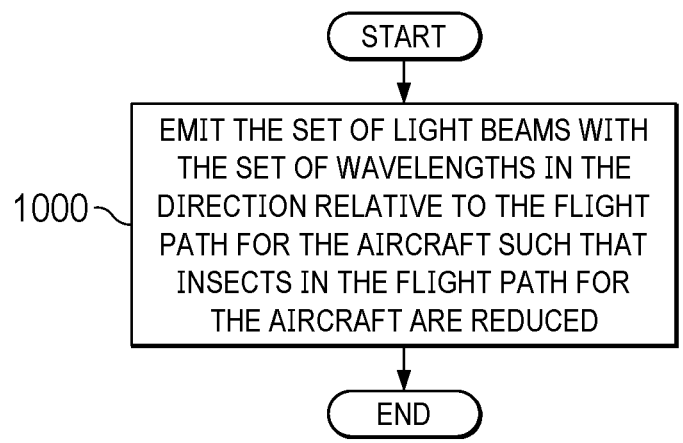
FIG. 10 is an illustration of a flowchart of a process for emitting a set of light beams in accordance with an illustrative embodiment.

With reference now to FIG. 10, an illustration of a flowchart of a process for emitting a set of light beams is depicted in accordance with an illustrative embodiment. The process in this figure is an example of an implementation for operation 902 in FIG. 9.

The process emits the set of light beams with the set of wavelengths in the direction relative to the flight path for the aircraft such that insects in the flight path for the aircraft are reduced (operation 1000). The process terminates thereafter.

Figure 11:
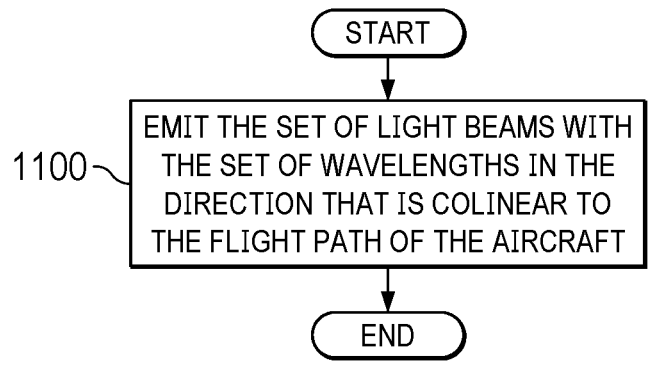
FIG. 11 is an illustration of a flowchart of a process for emitting a set of light beams in accordance with an illustrative embodiment.

In FIG. 11, an illustration of a flowchart of a process for emitting a set of light beams is depicted in accordance with an illustrative embodiment. The process in this figure is an example of an implementation for operation 902 in FIG. 9.

The process emits the set of light beams with the set of wavelengths in the direction that is colinear to the flight path of the aircraft (operation 1100). The process terminates thereafter.

Figure 12:
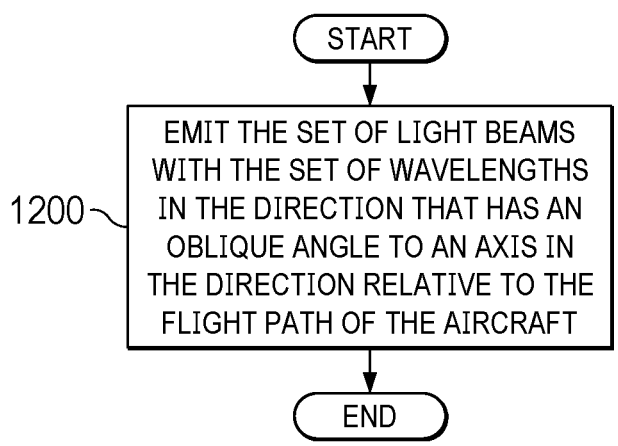
FIG. 12 is an illustration of a flowchart of a process for emitting a set of light beams in accordance with an illustrative embodiment.

Turning to FIG. 12, an illustration of a flowchart of a process for emitting a set of light beams is depicted in accordance with an illustrative embodiment. The process in this figure is an example of an implementation for operation 902 in FIG. 9.

The process emits the set of light beams with the set of wavelengths in the direction that has an oblique angle to an axis in the direction relative to the flight path of the aircraft (operation 1200). The process terminates thereafter.

Figure 13:
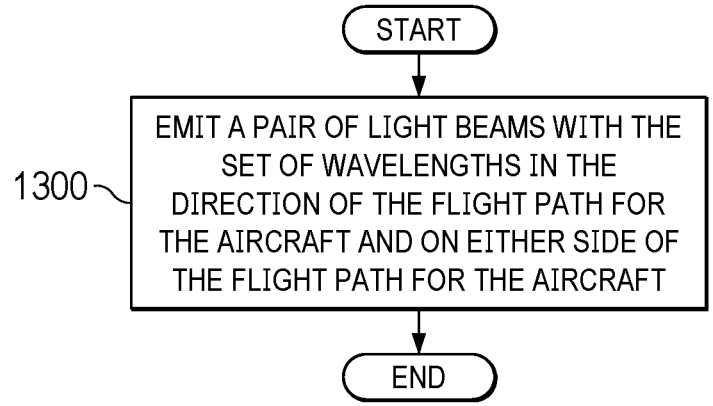
FIG. 13 is an illustration of a flowchart of a process for emitting a set of light beams in accordance with an illustrative embodiment.

Turning next to FIG. 13, an illustration of a flowchart of a process for emitting a set of light beams is depicted in accordance with an illustrative embodiment. The process in this figure is an example of an implementation for operation 902 in FIG. 9.

The process emits a pair of light beams with the set of wavelengths in the direction of the flight path for the aircraft and on either side of the flight path for the aircraft (operation 1300). The process terminates thereafter.

Figure 14:
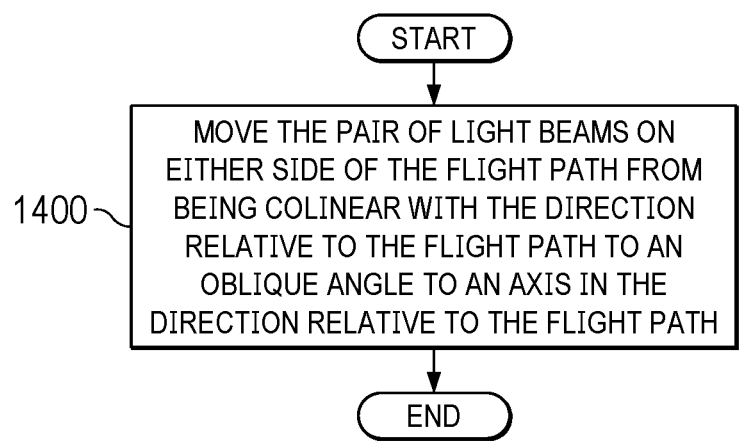
FIG. 14 is an illustration of a flowchart of a process for emitting a set of light beams in accordance with an illustrative embodiment.

Turning next to FIG. 14, an illustration of a flowchart of a process for emitting a set of light beams is depicted in accordance with an illustrative embodiment. The process in this figure is an example of an operation that can be performed with operation 1300 in FIG. 13.

The process moves the pair of light beams on either side of the flight path from being colinear with the direction relative to the flight path to an oblique angle to an axis in the direction relative to the flight path (operation 1400). The process terminates thereafter.

Figure 15:
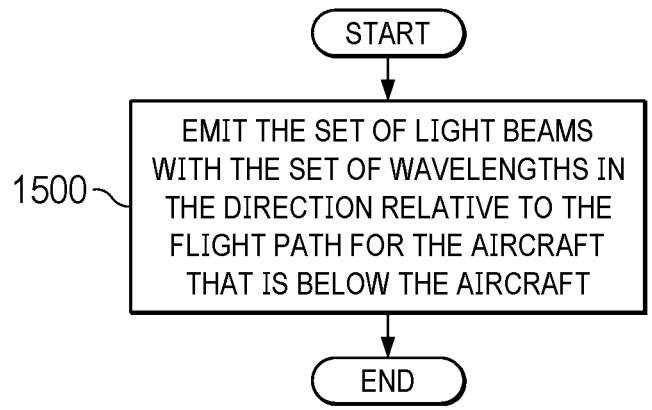
FIG. 15 is an illustration of a flowchart of a process for emitting a set of light beams in accordance with an illustrative embodiment.

Turning next to FIG. 15, an illustration of a flowchart of a process for emitting a set of light beams is depicted in accordance with an illustrative embodiment. The process in this figure is an example of an implementation for operation 902 in FIG. 9.

The process emits the set of light beams with the set of wavelengths in the direction relative to the flight path for the aircraft that is below the aircraft (operation 1500). The process terminates thereafter.

Figure 16:
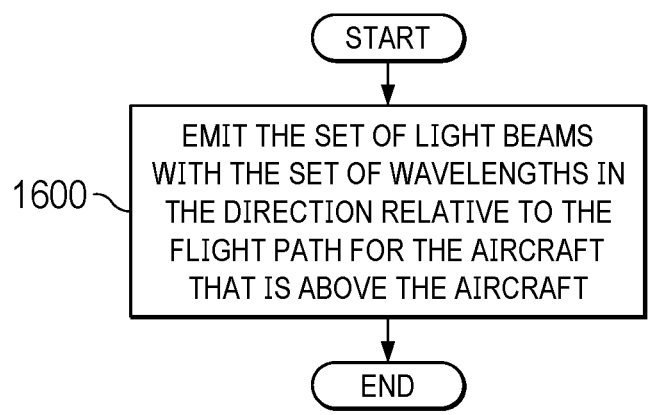
FIG. 16 is an illustration of a flowchart of a process for emitting a set of light beams in accordance with an illustrative embodiment.

Next in FIG. 16, an illustration of a flowchart of a process for emitting a set of light beams is depicted in accordance with an illustrative embodiment. The process in this figure is an example of an implementation for operation 902 in FIG. 9.

The process emits the set of light beams with the set of wavelengths in the direction relative to the flight path for the aircraft that is above the aircraft (operation 1600). The process terminates thereafter.

Figure 17:
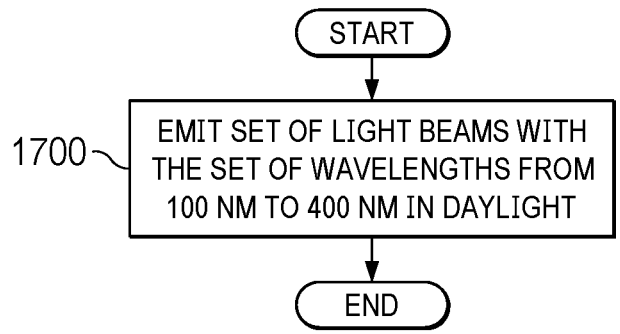
FIG. 17 is an illustration of a flowchart of a process for emitting a set of light beams in accordance with an illustrative embodiment.

Next in FIG. 17, an illustration of a flowchart of a process for emitting a set of light beams is depicted in accordance with an illustrative embodiment. The process in this figure is an example of an implementation for operation 902 in FIG. 9.

The process emits the set of light beams with the set of wavelengths from 100 nm to 400 nm in daylight (operation 1700). The process terminates thereafter.

Figure 18:
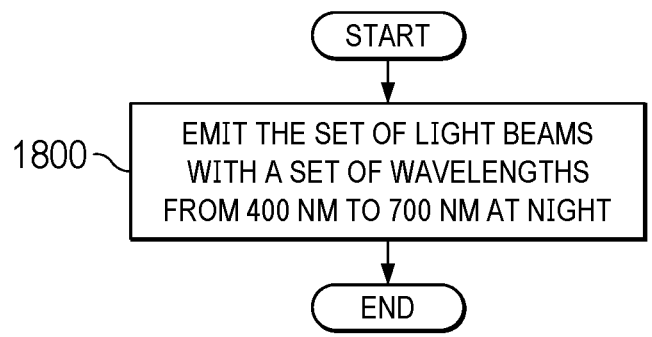
FIG. 18 is an illustration of a flowchart of a process for emitting a set of light beams in accordance with an illustrative embodiment.

With reference to FIG. 18, an illustration of a flowchart of a process for emitting a set of light beams is depicted in accordance with an illustrative embodiment. The process in this figure is an example of an implementation for operation 902 in FIG. 9.

The process emits the set of light beams with a set of wavelengths from 400 nm to 700 nm at night (operation 1800). The process terminates thereafter.

Figure 19:
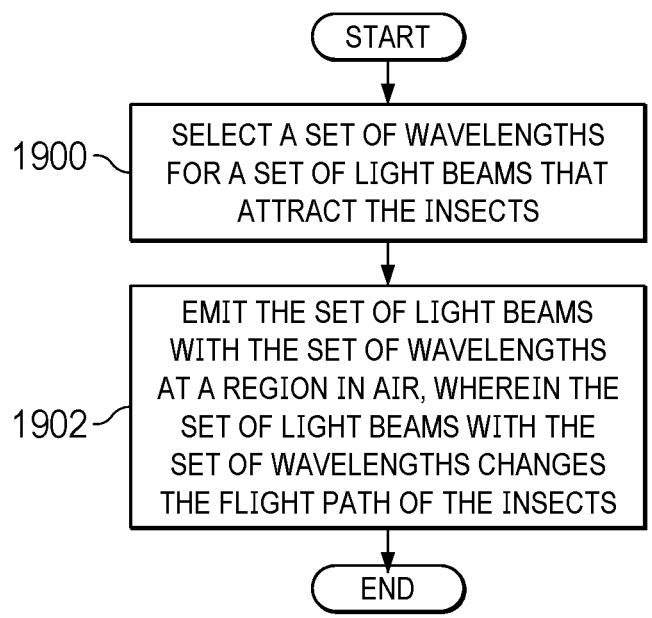
FIG. 19 is an illustration of a flowchart of a process for manipulating the flight path of insects in accordance with an illustrative embodiment.

With reference now to FIG. 19, an illustration of a flowchart of a process for manipulating the flight path of insects is depicted in accordance with an illustrative embodiment. The process in FIG. 19 can be implemented in hardware, software, or both. When implemented in software, the process can take the form of program instructions that are run by one of more processor units located in one or more hardware devices in one or more computer systems. For example, the process can be implemented in controller 214 in FIG. 2, and in controller 824 in FIG. 8.

The process selects a set of wavelengths for a set of light beams that attract the insects (operation 1900). The process emits the set of light beams with the set of wavelengths at a region in air, wherein the set of light beams with the set of wavelengths changes the flight path of the insects (operation 1902). The process terminates thereafter.

In this example, the flight path of the insects changes such that the insects move from a second region to the region in the air such that a density of insects in the region in the air is higher than the second region. Further, the flight path of the insects changes such that the insects move from a second region to the region in the air such that a density of insects in the second region is lower than the region.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The illustrative embodiments provide a method, apparatus, and system for reducing insect residue accumulation on an aircraft. In one example, a flight path clearing system comprises a light beam generator configured to emit a set of light beams and a controller. The controller is configured to select a set of wavelengths for the set of light beams that attract insects and control the light beam generator to emit the set of light beams with the set of wavelengths in a direction relative to the flight path for an aircraft.

The use of light beams emitted in a direction relative to a flight path of an aircraft can reduce the occurrence or performing of insect residue on aircraft. As result, increased aerodynamic formants can be present. This increased aerodynamic performance can reduce fuel usage during flight resulting in increased fuel efficiency for an aircraft.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system configured to attract insects away from a flight path of an aircraft, wherein the system comprises:
   a light beam generator configured to emit a set of light beams;
   a controller configured to:
      determine an axis of the flight path of the aircraft;
      select a set of wavelengths for the set of light beams, wherein the set of wavelengths attract insects located along the flight path; and
      control the light beam generator to emit the set of light beams with the set of wavelengths in a direction that initiates as colinear and moves to oblique relative to the axis of the flight path for an aircraft.

2. The flight path clearing system of claim 1, wherein the controller is further configured to control the light beam generator to emit the set of light beams with the set of wavelengths in the direction relative to the flight path for the aircraft such that insects in the flight path for the aircraft are reduced.

3. The flight path clearing system of claim 1, wherein the controller is further configured to control the light beam generator to emit the set of light beams with the set of wavelengths such that a length of a gap between the set of light beams increases as a distance of the set of light beams from the light beam generator-increases.

4. The flight path clearing system of claim 1, wherein the light beam generator is located on the aircraft and is configured to emit the set of light beams above and below the flight path of the aircraft.

5. The flight path clearing system of claim 1, wherein the controller is further configured to control the light beam generator to emit a pair of light beams with the set of wavelengths in the direction of the flight path for the aircraft and on either side of the flight path for the aircraft.

6. The flight path clearing system of claim 5, wherein the controller is further configured to control the light beam generator to move the pair of light beams such that the pair of light beams remain clear of an axis in the direction relative to the flight path.

7. The flight path clearing system of claim 1, wherein the controller is further configured to control the light beam generator to emit the set of light beams with the set of wavelengths in the direction relative to the flight path for the aircraft that is below the aircraft.

8. The flight path clearing system of claim 1, wherein the controller is further configured to control the light beam generator to emit the set of light beams with the set of wavelengths in the direction relative to the flight path for the aircraft that is above the aircraft.

9. The flight path clearing system of claim 1, wherein the light beam generator is located in a ground location.

10. The flight path clearing system of claim 1, wherein the light beam generator is located in the aircraft.

11. The flight path clearing system of claim 1, wherein the light beam generator comprises:
an elongate structure;
a reflector connected to the elongate structure; and
a light source positioned to emit the set of light beams at the reflector, wherein the reflector is positioned to direct the set of light beams in the direction relative to the flight path for the aircraft.

12. The flight path clearing system of claim 1, wherein the light beam generator comprises:
an unmanned aerial vehicle;
a reflector connected to the unmanned aerial vehicle; and
a light source positioned to emit the set of light beams at the reflector while the unmanned aerial vehicle is flying, wherein the unmanned aerial vehicle with the reflector is positioned to direct the set of light beams in the direction relative to the flight path for the aircraft.

13. The flight path clearing system of claim 1, wherein the controller is configured to:
control the light beam generator to emit the set of light beams with a set of wavelengths from 200 to 400 nanometers in daylight.

14. The flight path clearing system of claim 1, wherein the controller is configured to:
control the light beam generator to emit the set of light beams with a set of wavelengths from 400 to 600 nanometers at night.

15. The flight path clearing system of claim 1, wherein the set of wavelengths are from 200 to 600 nanometers.

16. The flight path clearing system of claim 1, wherein the light beam generator is selected from at least one of a laser, a xenon arc lamp, a halogen lamp, a light emitting diode lamp system, or a coherent light source.

17. The flight path clearing system of claim 1, wherein the set of light beams with the set of wavelengths emitted in the direction relative to the flight path for the aircraft reduces the insects in the flight path.

18. The flight path clearing system of claim 1, wherein a light beam in the set of light beams is modulated by changing an intensity, changing a wavelength, or pulsing an emission of the light beam.

19. A method for clearing insects away from a flight path, the method comprising:
determining an axis of the flight path of an aircraft;
selecting, using a controller, a set of wavelengths for a set of light beams, wherein the set of wavelengths attract insects; and
emitting, using a light beam generator, the set of light beams with the set of wavelengths in a direction initiating as colinear and sweeping to oblique relative to the axis of the flight path for the aircraft.

20. The method of claim 19, wherein said emitting the set of light beams comprises:
emitting the set of light beams with the set of wavelengths in the direction relative to the flight path for the aircraft such that insects in the flight path for the aircraft are reduced.

21. The method of claim 20, wherein birds in the flight path for the aircraft are reduced as a result of reducing the insects in the flight path for the aircraft.

22. The method of claim 19, wherein said emitting the set of light beams comprises:
emitting the set of light beams with the set of wavelengths in the direction that is colinear to the flight path of the aircraft.

23. The method of claim 19, wherein said emitting the set of light beams comprises:
emitting the set of light beams with the set of wavelengths in the direction that has an oblique angle to an axis in the direction relative to the flight path of the aircraft.

24. The method of claim 19, wherein said emitting the set of light beams comprises:
emitting the pair of light beams with the set of wavelengths in the direction of the flight path for the aircraft and on either side of the flight path for the aircraft.

25. The method of claim 24, wherein said emitting the set of light beams comprises:
moving the set of light beams on either side of the flight path from being colinear with the direction relative to the flight path to an oblique angle to an axis in the direction relative to the flight path.

26. The method of claim 19, wherein said emitting the set of light beams comprises:
emitting the set of light beams with the set of wavelengths in the direction relative to the flight path for the aircraft that is below the aircraft.

27. The method of claim 19, wherein said emitting the set of light beams comprises:
emitting the set of light beams with the set of wavelengths in the direction relative to the flight path for the aircraft that is above the aircraft.

28. The method of claim 19, wherein said emitting the set of light beams comprises:
emitting the set of light beams with the set of wavelengths from 100 nm to 400 nm in daylight.

29. The method of claim 19, wherein said emitting the set of light beams comprises:
emitting the set of light beams with the set of wavelengths from 400 nm to 700 nm at night.

30. The method of claim 19, wherein the set of light beams are selected to have a set of wavelengths selected from at least one of 100 nm to 400 nm or 400 nm to 700 nm.

31. The method of claim 19, wherein a light beam in the set of light beams is modulated by changing an intensity, changing a wavelength, or pulsing an emission of the light beam.

32. A flight path clearing system that comprises:
a laser beam generator configured to emit a set of laser beams;
a receiver configured to detect a backscatter light generated in response to the laser beam generator emitting the set of laser beams; and
a controller having modes of operation, wherein the controller in a first mode of operation is configured to:
control the laser beam generator to emit a set of laser beams in a direction that initiates as colinear and moves to oblique relative to an axis of a flight path for an aircraft;
detect the backscatter light generated in response to an emission from the laser beam generator of the set of laser beams; and
determine a set of parameters based upon the backscatter light detected by the receiver;
wherein the controller in a second mode of operation is configured to:
select a set of wavelengths that attract insects; and
control the laser beam generator to emit the set of laser beams with the set of wavelengths in a direction that initiates as colinear and moves to oblique relative to the axis of the flight path for an aircraft.

33. The flight path clearing system of claim 32, wherein the flight path clearing system is a ground lidar system, and wherein the set of parameters is for at least one of: clear air turbulence, wake turbulence, wind shear, a wind profile, a temperature profile, an aerosol concentration, a particular concentration, or a presence of a group of objects.

34. The flight path clearing system of claim 32, wherein the flight path clearing system is an aircraft lidar system, and wherein the set of parameters is for at least one of an air speed, a direction of travel, a temperature, air density, an angle of sideslip, an angle of attack, or a presence of a group of objects.

35. A method for manipulating a flight path of insects, the method comprising:
determining an axis of a flight path of an aircraft;
selecting, using a controller, a set of wavelengths for a set of light beams attracting the insects; and
manipulating the flight path of insects by emitting, using a light beam generator, the set of light beams with the set of wavelengths in a direction initiating at colinear and sweeping to oblique relative to the axis of the flight path of the aircraft.

36. The method of claim 35, wherein the flight path of the insects changes such that the insects move from a second region to a region in the air located oblique to the axis of the flight path of the aircraft such that a density of insects in the region in the air is higher than the second region.

37. The method of claim 35, wherein the flight path of the insects changes such that the insects move from a second region to a region in the air located oblique to the axis of the flight path of the aircraft such that a density of insects in the second region is lower than the region in the air.

* * * * *